No. 840,188. PATENTED JAN. 1, 1907.
A. J. ADAMS.
UMBRELLA SUPPORT.
APPLICATION FILED SEPT. 6, 1906.
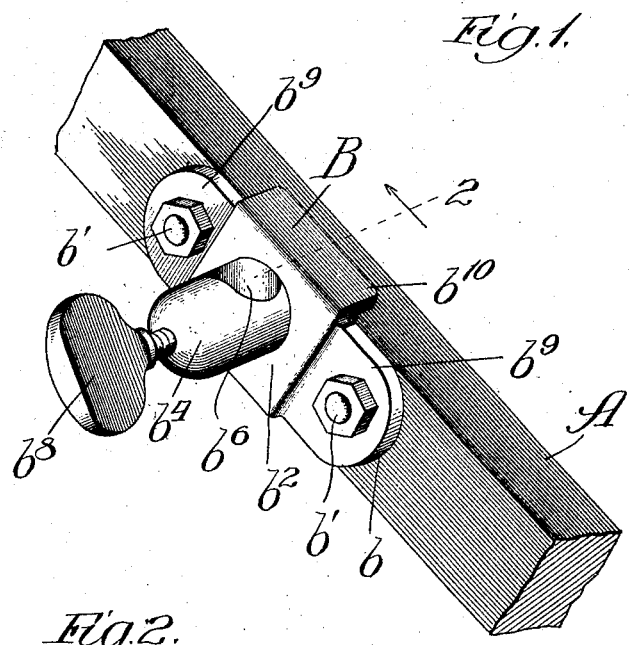
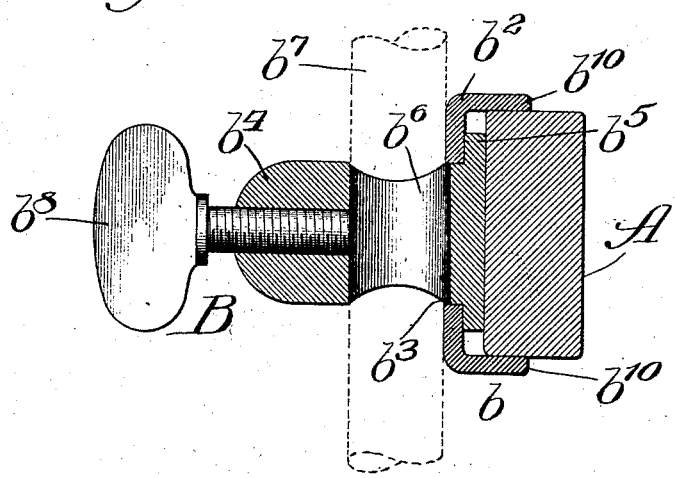

UNITED STATES PATENT OFFICE.

ARTHUR J. ADAMS, OF CHICAGO, ILLINOIS, ASSIGNOR TO FULTON MANUFACTURING COMPANY, A CORPORATION OF ILLINOIS.

UMBRELLA-SUPPORT.

No. 840,188.      Specification of Letters Patent.      Patented Jan. 1, 1907.

Application filed September 6, 1906. Serial No. 333,553.

*To all whom it may concern:*

Be it known that I, ARTHUR J. ADAMS, a citizen of the United States, residing at Chicago, in the county of Cook and State of Illinois, have invented a new and useful Improvement in Umbrella-Supports, of which the following is a specification.

My invention relates particularly to umbrella-supports for use in connection with baby-carriages. In the particular form herein shown the device is especially adapted for use in connection with the baby-carriage shown in my Patent No. 789,310, granted May 9, 1905.

My primary object is to provide a simple, cheap, and reliable device which can be readily adjusted to vary the inclination of the umbrella-rod.

The invention is illustrated in its preferred embodiment in the accompanying drawings, in which—

Figure 1 represents a fragment of the handle of a baby-carriage, such as is shown in the above-mentioned patent, equipped with my improved umbrella-support; and Fig. 2, a section taken as indicated at line 2 of Fig. 1.

In the drawings, A represents a side bar of a handle of a baby-carriage or go-cart, and B my improved umbrella-support applied thereto. The device B comprises a clip $b$, secured by bolts $b'$ to the bar A and having a central raised or struck-out portion $b^2$, provided with a perforation $b^3$, a horizontally-disposed rotatable member $b^4$ having a circular portion fitting in the perforation $b^3$ and equipped with a flange $b^5$, confined between the raised portion of the clip and the handle-bar, the shank of said member having a transverse perforation $b^6$, which serves to receive the umbrella-rod $b^7$, (shown dotted,) and a thumb-screw $b^8$, threaded into an axial perforation with which the shank of the member $b^4$ is provided at its outer end, said perforation intersecting the transverse perforation $b^6$.

The clip $b$ may be stamped from sheet metal. It has the perforate end portions $b^9$, bearing upon the outer lateral face of the handle-bar, and inturned lateral flanges $b^{10}$, which embrace the upper and lower edge surfaces of the handle-bar.

The member $b^4$ may be turned out of solid steel rod and provided with the necessary bores. The bore $b^6$ has its inner wall lying slightly inside the outer surface of the enlargement $b^2$ of the clip, so that the screw $b^8$ will serve at once to clamp the umbrella-rod against the clip and to draw the flange $b^5$ tightly against the inner surface of the raised portion of the clip. It is obvious that by loosening the set-screw the member $b^4$ may be rotated to give the desired inclination to the umbrella-rod.

The shape of the clip may be altered to accommodate the clip to various shapes of handle-bars or other parts whereunto it may be attached.

What I regard as new, and desire to secure by Letters Patent, is—

1. In an umbrella-support, the combination of a clip having a raised portion provided with a perforation, and having also means for attachment to a member, such as a handle-bar; a rotatable member having a neck portion received by said perforation and a flange bearing against the inner surface of said raised portion, said rotatable member having a transverse perforation closely adjacent to the outer surface of the raised portion of said clip and having also an intersecting axial perforation, and a thumb-screw extending through said axial perforation.

2. In an umbrella-support, the combination of a clip having a raised portion provided with a perforation and attaching end portions adapted to bear upon a lateral surface of a handle-bar and lateral flanges adapted to embrace the edge surfaces of said handle-bar, a rotatable member having a circular portion received by said perforations and a flange bearing against the inner surface of said clip, said rotatable member having a transverse bore closely adjacent to the clip and an intersecting threaded axial bore, and a set-screw adapted to engage an umbrella-rod extending through said transverse bore.

3. The combination with a handle-bar, of a clip secured thereto having a body separated from one side of said bar by a space, said body containing a perforation, a member having a shank extending through said perforation and a head rotatably confined between said bar and the body of the clip, said shank having a transverse perforation whose inner wall lies inside the plane of the outer surface of the body of the clip and said shank having also an axial threaded perforation intersecting said first-named perforation, and a clamping-screw extending through said threaded perforation and serving to clamp an umbrella-rod against the outer surface of said clip.

ARTHUR J. ADAMS.

In presence of—
L. HEISLAR,
C. W. WASHBURNE.